UNITED STATES PATENT OFFICE 2,691,652

ACYLOXY POLYMETHINE DYES

Earl Van Lare and Leslie G. S. Brooker, Rochester, N. Y., assignors to Eastman Kodak Company, Rochester, N. Y., a corporation of New Jersey No Drawing. Application November 17, 1951, Serial No. 256,970

18 Claims. (Cl. 260—240.65)

This invention relates to acyloxy polymethine dyes and to methods for making them.

In our copending application Serial No. 119,008, filed September 30, 1949, now U. S. Patent 2,575,-373, issued November 20, 1951, we have described a process for obtaining acyloxy polymethine dye intermediates represented by the following general formula

I.

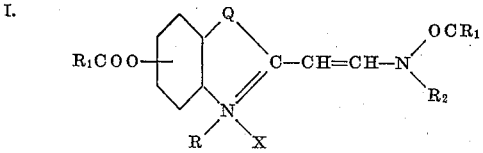

wherein Q represents a member selected from the group consisting of an oxygen atom and a sulfur atom. R represents an alkyl group, especially a primary alkyl group, e. g. methyl, ethyl, n-propyl, isobutyl, n-butyl, $\beta$-hydroxy-ethyl, $\beta$-methoxyethyl, $\beta$-ethoxyethyl, $\beta$-acetoxyethyl, $\beta$-carboxyethyl, carboxymethyl, $\beta$-carbomethoxyethyl, $\beta$-carbethoxyethyl, allyl, $\beta$-methallyl, etc., $R_1$ represents an alkyl group, e. g. methyl, ethyl, n-propyl, isopropyl, etc., $R_2$ represents an aryl group, e. g. phenyl, p-chlorophenyl, p-methoxyphenyl, $\beta$-naphthyl, etc., and X represents an anion, e. g. chloride, bromide, iodide, benzenesulfonate, p-toluenesulfonate, methylsulfate, ethylsulfate, thiocyanate, perchlorate, acetate, propionate, etc.

This application is a continuation-in-part application of Serial No. 119,008, now Patent No. 2,575,373.

In our U. S. Patent 2,541,015, issued February 13, 1951, we have described a process for obtaining hydroxy cyclammonium alkyl quaternary salts having the following general formula:

Ia.

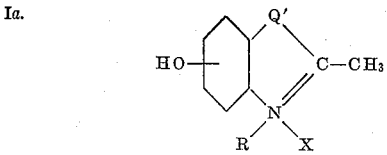

wherein R and X have the values given above and Q' represents an oxygen, sulfur, or selenium atom.

According to the method described in our copending application Serial No. 119,008, now Patent No. 2,575,373, we prepare the acyloxy polymethine dye intermediates represented by Formula I above by condensing an intermediate selected from those represented by Formula Ia above with a diarylformamidine in the presence of a carboxylic anhydride.

For purposes of convenience, the dye intermediates represented by Formula Ia which are useful in practicing the instant invention can be represented by the following single formula:

II.

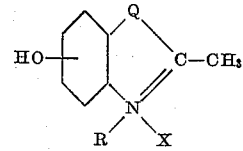

wherein R, Q, and X have the values given above.

The instant invention relates to acyloxy polymethine dyes selected from those represented by the following general formulas:

III.

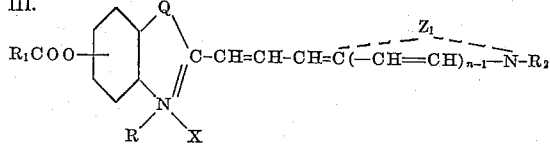

IV.

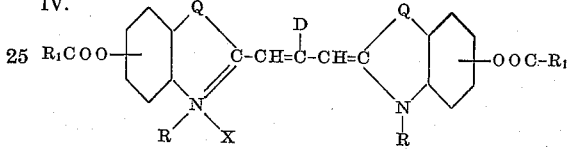

and

V.

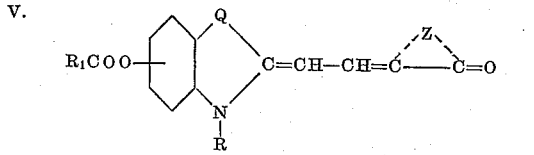

wherein R, $R_1$, Q, and X have the values given above, D represents a hydrogen atom or an alkyl group, such as methyl, ethyl, n-propyl, n-butyl, etc. (especially a methyl or an ethyl group), $R_2$ represents an alkyl group, such as methyl, ethyl, n-propyl, n-butyl, etc. $n$ represents a positive integer of from 1 to 2, and Z and $Z_1$ each represents the non-metallic atoms necessary to complete a heterocyclic nucleus as more fully defined below.

It is, accordingly, an object of our invention to provide new acyloxy polymethine dyes. A further object is to provide methods for making such acyloxy polymethine dyes. Still another object is to provide photographic silver halide emulsions containing these new acyloxy polymethine dyes. Other objects will become apparent from a consideration of the following description and examples.

According to our invention we prepare the acyloxy polymethine dyes represented by Formula III above by condensing an intermediate selected from those represented by Formula I above with a cyclammonium quaternary salt selected from those represented by the following general formula:

VI.

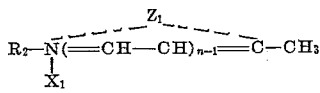

wherein $R_2$ has the values given above, $X_1$ represents an anion, such as those set forth for X above, $n$ represents a positive integer of from 1 to 2, and $Z_1$ represents the non-metallic atoms necessary to complete a heterocyclic nucleus containing from 5 to 6 atoms in the heterocyclic ring, such as, for example, those of the thiazole series, those of the benzothiazole series, those of the naphthothiazole series ($\alpha$- or $\beta$-), those of the selenazole series, those of the benzoselenazole series, those of the oxazole series, those of the benzoxazole series, those of the naphthoxazole series, those of the 2-quinoline series, those of the 4-quinoline series, those of the thiazoline series, etc. Heating accelerates the condensations and temperatures varying from room temperature to the reflux temperature of the reaction mixture can be employed. Advantageously the condensations are carried out in the presence of an inert diluent, such as methanol, ethanol, 1,4-dioxane, pyridine, etc., and a tertiary amine acid-binding agent, such as triethylamine, tri-n-propylamine, tri-n-butylamine, N, N-diethylaniline, N-methyl-piperidine, etc.

Typical intermediates represented by Formula VI above comprise the 2,4-dimethylthiazole quaternary salts, the 2 - methylbenzothiazole quaternary salts, the 2-methyl-$\beta$-naphthothiazole quaternary salts, the 2-methyl-$\alpha$-naphthothiazole quaternary salts, the 2,4-dimethylselenazole quaternary salts, the 2-methylbenzoselenazole quaternary salts, the 2,4-dimethyloxazole quaternary salts, the 2-methylbenzoxazole quaternary salts, the 2-methyl-$\beta$-naphthoxazole quaternary salts, the quinaldinium quaternary salts, the lepidinium quaternary salts, the 2-methylthiazoline quaternary salts, etc.

The following examples will serve to illustrate more fully the manner whereby we prepare the carbocyanine dyes represented by Formula III above.

*Example 1.—5-acetoxy-3,3'-diethyl-4'-methyl-oxathiazolocarbocyanine iodide*

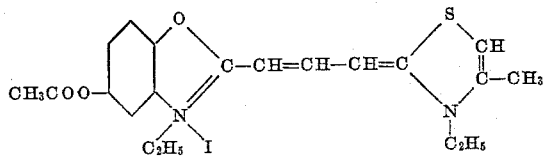

1.2 g. of 2-$\beta$-acetanilidovinyl-5-acetoxybenzoxazole ethiodide, 0.68 g. of 2,4-dimethylthiazole ethiodide, 10 cc. of absolute ethyl alcohol and 0.27 g. of triethylamine were mixed in a 200 cc. flask and refluxed for 10 minutes. The reaction mixture was chilled to 0° C. and the acetoxy dye which separated was filtered off, washed with acetone, and then with water. The dye was twice recrystallized from ethyl alcohol and obtained as red crystals melting at 217° to 218° C. with decomposition.

In a manner similar to that illustrated in the foregoing example, 2-methyl-4-phenylthiazole ethiodide, 2-methylbenzothiazole etho-p-toluenesulfonate, quinaldine ethiodide, etc. can be condensed with 2-$\beta$-acetanilidovinyl-5-acetoxybenzoxazole ethiodide and other of our new acyloxy intermediates, to give acyloxycarbocyanine dyes.

The acyloxy carbocyanine dyes can be hydrolyzed to give hydroxycarbocyanine dyes by hydrolyzing with an alkali metal hydroxide, e. g. sodium or potassium hydroxide, in an alcohol, e. g. methyl, ethyl or isopropyl alcohol. The following example will further illustrate the manner of obtaining hydroxycarbocyanine dyes.

*Example 2.—3,3'-diethyl-5-hydroxy-4'-methyl-oxathiazolocarbocyanine iodide*

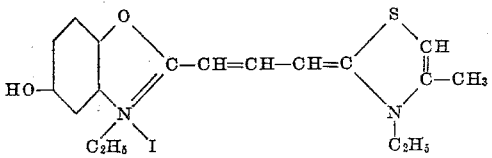

0.5 g. of 5-acetoxy-3,3'-diethyl-4'-methyloxathiazolocarbocyanine iodide and 10 cc. of ethyl alcohol were heated to boiling and 0.2 cc. of 40% (by weight) sodium hydroxide were added. Boiling was continued for 30 seconds. The hot solution was filtered and the filtrate cooled to about 20° C. The cool filtrate was made acid with glacial acetic acid and the mixture chilled to 0° C. The hydroxy dye which separated was filtered off and washed lightly with ethyl alcohol. The dye was recrystallized from ethyl alcohol and obtained as lustrous red crystals, melting at 253° to 254° C. with decomposition.

In a similar manner, other acyloxy carbocyanine dyes obtained in accordance with our invention can be hydrolyzed to hydroxy carbocyanine dyes.

According to our invention we prepare the acyloxy polymethine dyes represented by Formula IV above by condensing an intermediate selected from those represented by Formula II above with an ortho carboxylic ester in the presence of an organic carboxylic anhydride. Heating accelerates the condensations and temperatures varying from room temperature to the reflux temperature of the reaction mixture can be used. Advantageously the condensations are carried out in the presence of an inert diluent, such as pyridine, ethanol, n-propanol, isopropanol, n-butanol, etc. A basic condensing agent can be employed, if desired. Such basic condensing agents include the trialkylamines (e. g. triethylamine, tri-n-propylamine, triisopropylamine, tri-n-butylamine, tri-n-amylamine, etc.), N-alkylpiperidines (e. g. N-methylpiperidine, N-ethylpiperidine, etc.), the N,N-dialkylanilines (e. g. N,N - dimethylaniline, N,N - diethylaniline, etc.), etc.

Representative ortho carboxylic esters include those represented by the following general formula:

VII. 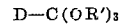

wherein D has the values given above and R' represents an alkyl group, such as methyl, ethyl, n-propyl, n-butyl, etc. groups. Typical ortho carboxylic esters include ethyl orthoacetate, ethyl orthopropionate, ethyl orthoformate, methyl orthoformate, etc.

Representative organic carboxylic anhydrides include those represented by the following general formula:

VIII. 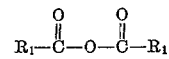

wherein $R_1$ has the values given above. Typical anhydrides are: acetic anhydride, propionic anhydride, n-butyric anhydride, isobutyric anhydride, valeric anhydride, etc.

Alternatively the acyloxy polymethine dyes represented by Formula IV above can be prepared by first acylating the intermediates represented by Formula II above with one of the anhydrides selected from those represented by Formula VIII above, followed by condensation of the acylated intermediate with an ortho carboxylic ester selected from those represented by Formula VII above.

Still another alternative procedure comprises condensing an intermediate selected from those represented by Formula II above with an ortho carboxylic ester, followed by acylation of the hydroxy carbocyanine dye with an organic carboxylic acid selected from those represented by Formula VIII above.

The following examples will serve to illustrate more fully the manner whereby we prepare the acyloxy polymethine dyes selected from those represented by Formula IV above.

*Example 3.—5,5'-diacetoxy-3,3',9-trimethylthiacarbocyanine iodide*

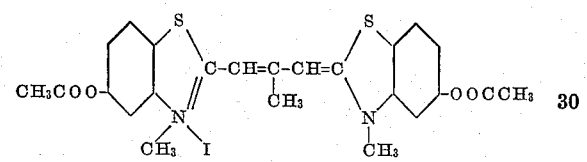

5 - hydroxy-2-methylbenzothiazole methiodide (1.4 g., 2 mol.) and ethyl orthoacetate (0.75 g., 2 mol.) were suspended in pyridine (15 cc.) and acetic anhydride (1.0 g., 4 mol.) was added. The mixture was refluxed for 45 minutes, chilled, and the crude dye (0.5 g., 37%) filtered off and washed with ethyl alcohol. After two recrystallizations from methyl alcohol, the yield of dye was 0.22 g. (16%); M. P. 292–293° C. with decomposition.

*Example 4.—5,5'-diacetoxy-3,3'-diethyl-9-methylthiacarbocyanine bromide*

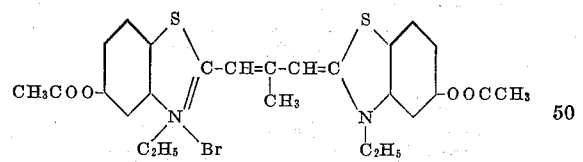

5-hydroxy-2-methylbenzothiazole ethobromide (2.74 g., 2 mol.) and ethyl orthoacetate (1.62 g., 2 mol.) were suspended in pyridine (15 cc.) and acetic anhydride (4 g., 4 mol.) was added. The mixture was refluxed 30 minutes, chilled, and the crude dye (0.33 g., 10%) filtered off and washed with ethyl alcohol. After two recrystallizations from methyl alcohol, the yield of dye was 0.12 g. (4%); M. P. 249–250° C. with decomposition.

*Example 5.—6,6'-diacetoxy-3,3',9-trimethylthiacarbocyanine iodide*

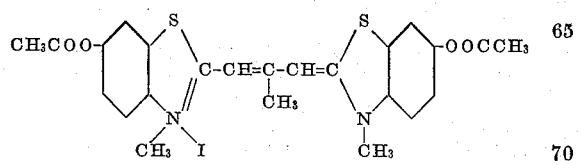

6 - hydroxy-2-methylbenzothiazole methiodide (1.8 g., 2 mol) and ethyl orthoacetate (1.9 g., 2 mol.) were suspended in pyridine (15 cc.) and acetic anhydride (2.4 g., 4 mol.) was added. The mixture was refluxed 45 minutes, chilled, and the crude dye (1.0 g., 57%) filtered off and washed with ethyl alcohol. After two recrystallizations from methyl alcohol, the yield of dye was 0.3 g. (17%); M. P. 249–250° C. with decomposition.

*Example 6.—6,6'-diacetoxy-3,3'-diethyl-9-methylthiacarbocyanine iodide*

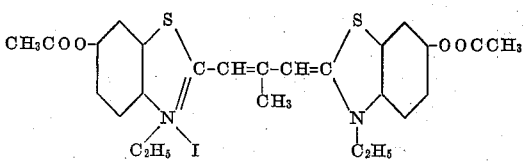

6-hydroxy-2-methylbenzothiazole ethiodide (2 g., 2 mol.) and ethyl orthoacetate( 1 g., 2 mol.) were suspended in pyridine (15 cc.) and acetic anhydride (3 g., 4 mol.) was added. The mixture was refluxed 45 minutes, chilled, and the crude dye (0.55 g., 26%) filtered off and washed with ethyl alcohol. After two recrystallizations from methyl alcohol the yield of dye was 0.35 g. (18%); M. P. 253–254° C. with decomposition.

*Example 7.—5,5'-diacetoxy-3,3'-diethyloxacarbocyanine iodide*

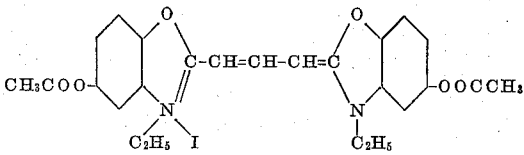

5-acetoxy-2-methylbenzoxazole ethiodide (3.5 g., 2 mol.) and ethyl orthoformate (15 g., 2 mol.) were suspended in pyridine (10 cc.). The mixture was refluxed 2 hours, chilled, and the crude dye (1.1 g., 38%) filtered and washed with acetone and water. After two recrystallizations from methyl alcohol, the yield of dye was 0.48 g. (16%); M. P. 227–229° C. with decomposition.

*Example 8.—5,5'-diacetoxy-3,3'-diethyl-9-methyloxacarbocyanine perchlorate*

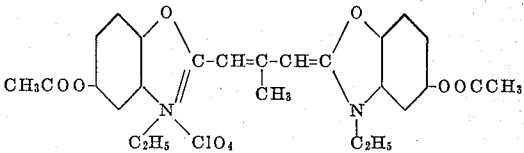

5-acetoxy-2-methylbenzoxazole ethiodide (3.5 g., 2 mol.) and ethyl orthoacetate (1.62 g., 2 mol.) were suspended in pyridine (10 cc.). The mixture was refluxed 1½ hours and chilled. The dye was precipitated with ether, and the precipitate dissolved in a small amount of ethyl alcohol. Addition of a saturated aqueous solution of a sodium perchlorate (1.4 g.) caused the dye to separate as the perchlorate (0.13 g., 4%). After two recrystallizations from ethyl alcohol, the yield of dye was 0.05 g. (2%); M. P. 250–251° C. with decomposition.

*Example 9.—9-ethyl-3,3'-dimethyl-5,5'-dipropionoxythiacarbocyanine iodide*

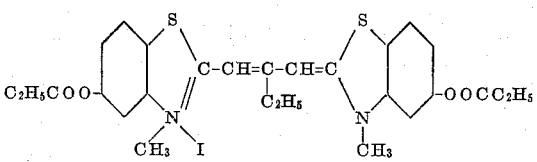

5 - hydroxy-2-methylbenzothiazole methiodide (1.4 g., 2 mol.) and ethyl orthopropionate (1.7 g., 2 mol.) were suspended in pyridine (10 cc.). The mixture was refluxed 45 minutes, chilled, filtered, and the crude dye (0.8 g., 50%) washed with ether and water and dried. The crude hydroxy dye was dissolved in propionic anhydride (15 cc.) and triethylamine (1 cc.) and refluxed for 10 minutes. After cooling and filtering, the yield of crude dye was 0.3 g. (21%). After recrystallization from ethyl alcohol, the yield of dye was 0.27 g. (19%); M. P. 250–251° C. with decomposition.

*Example 10.—9-ethyl-3,3'-dimethyl-6,6'-dipropionoxythiacarbocyanine iodide*

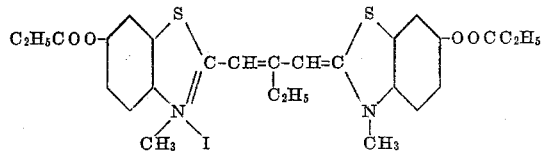

6-hydroxy-2-methylbenzothiazole methiodide (1.8 g., 2 mol.) and ethyl orthopropionate (1.1 g., 2 mol.) were suspended in pyridine (15 cc.) and refluxed for 1 hour. After chilling, filtering and washing with ethyl alcohol, the yield of hydroxy dye was 0.4 g. (21%). This was dissolved in propionic anhydride (15 cc.) and triethylamine (1 cc.) and refluxed for 10 minutes. The mixture was cooled and the dye (0.13 g., 7%) filtered and washed with acetone. After recrystallization from ethyl alcohol, the yield was 0.1 g. (5%); M. P. 227–228° C. with decomposition.

*Example 11.—3,3',9-triethyl-6,6'-dipropionoxythiacarbocyanine iodide*

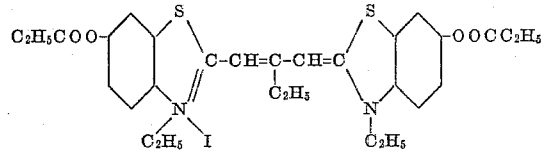

6-hydroxy-2-methylbenzothiazole ethiodide (2 g., 2 mol.) and ethyl orthopropionate (1.1 g., 2 mol.) were suspended in pyridine (15 cc.) and refluxed for 30 minutes. After chilling, filtering, and washing with ethyl alcohol, the yield of hydroxy dye was 0.55 g. (26%). This was dissolved in propionic anhydride (15 cc.) and triethylamine (1 cc.) and refluxed for 10 minutes. After cooling and filtering, the yield of dye was 0.2 g. (10%). After recrystallization from ethyl alcohol, the yield of dye was 0.1 g. (5%); M. P. 200–201° C. with decomposition.

Operating in similar manner, other acyloxy polymethine dyes selected from those represented by Formula IV can be prepared. The dyes of Formula IV wherein D represents an alkyl group have been found to be especially useful and represent a preferred embodiment of our invention.

The acyloxy merocarbocyanine dyes represented by Formula V above can advantageously be prepared by condensing an acyloxy dye intermediate selected from those represented by Formula I above, in the presence of an acid-binding agent, with a nitrogen-containing heterocyclic ketomethylene compound selected from those represented by the following general formula:

IX.

wherein Z represents the non-metallic atoms necessary to complete a nitrogen-containing heterocyclic ring having from 5 to 6 atoms in the heterocyclic ring. These acyloxy merocarbocyanine dyes, upon hydrolysis, give hydroxy merocarbocyanine dyes which can be represented by the following general formula:

X.

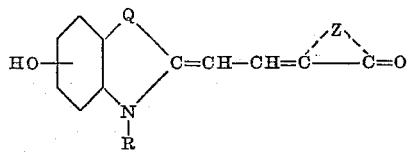

wherein Q, R, and Z have the values given above.

The condensations which give the acyloxy merocarbocyanine dyes are advantageously carried out in the presence of a tertiary amine acid-binding agent, e. g. trialkylamines (trimethyl, triethyl, tri-n-propyl, triisobutyl, tri-n-butyl, triisoamyl, tri-β-hydroxyethyl, etc. amines), N-alkylpiperidines (N-methyl, N-ethyl, N-n-propyl, N-n-butyl, etc. piperidines), etc. The condensations are advantageously carried out in a solvent, e. g. ethyl, n-propyl, isopropyl, n-butyl or isobutyl alcohols. Heat accelerates the condensations and the condensations are advantageously effected at a temperature of from 60° to 100° C. although higher or lower temperatures can be employed.

Typical of the nitrogen heterocyclic ketomethylene compounds represented by Formula IX are: the rhodanines (e. g. rhodanine, 3-methyl-, 3-ethyl-, 3-lauryl-, 3-phenyl-, 3-β-hydroxyethyl-, 3-carboxymethyl-, 3-β-carboxyethyl-, 3-p-carboxyphenyl-, 3-p-sulfophenyl-, etc. rhodanines), the 2-thio-2,4(3,5)-oxazolediones (e. g. 3-ethyl-, 3-lauryl-, 3-carboxymethyl-, 3-p-carboxyphenyl-, 3-p-sulfophenyl-, etc. 2-thio-2,4(3,5)-oxazolediones), the 2-thiohydantoins (e. g. 2-thiohydantoin, 3-ethyl-1-phenyl-, 1,3-diphenyl-, 1-(p-carboxyphenyl)-3-phenyl-, 1-carboxymethyl-3-phenyl-, etc. 2-thiohydantoins), the barbituric acids (e. g. barbituric acid, 1,3-diethylbarbituric acid, 1-carboxymethyl-3-phenylbarbituric acid, etc.), the thiobarbituric acids (e. g. 2-thiobarbituric acid, 1,3-dimethyl-2-thiobarbituric acid, 1-carboxymethyl-3-phenyl-2-thiobarbituric acid, etc.), etc.

The following examples will serve to illustrate the preparation of our new acyloxy merocarbocyanine dyes.

*Example 12.—5-[(5-acetoxy-3-ethyl-2(3)-benzoxazolylidene)ethylidene]-3-ethylrhodanine*

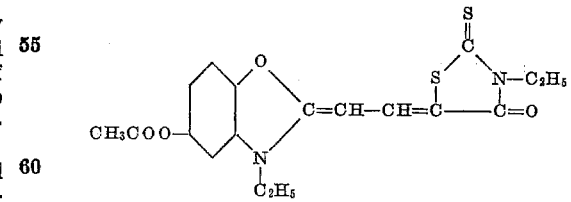

1.2 g. of 5-acetoxy-2-β-acetanilidovinylbenzoxazole ethiodide, 0.5 g. of 3-ethylrhodanine, 10 cc. of absolute ethyl alcohol and 0.27 g. of triethylamine were mixed in a 200 cc. flask and refluxed for 5 minutes. The dye separated in the hot. The reaction mixture was chilled to 0° C. and the separated solid was filtered off, washed with methyl alcohol and dried. A yield of crude dye of 0.7 g. was obtained. The dye was twice recrystallized from a mixture of equal volumes of pyridine and methyl alcohol. It was obtained as fine orange needles, melting at 253–254° C. with decomposition.

Example 13.—5-[(5-acetoxy-3-ethyl-2(3)-benz-oxazolylidene)ethylidene]-3-ethyl-1-phenyl-2-thiohydantoin

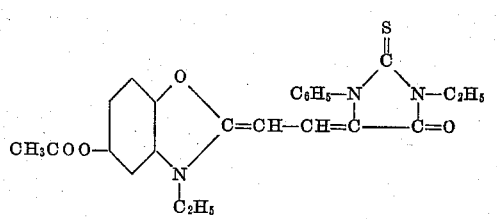

1.2 g. of 2-β-acetanilidovinyl-5-acetoxybenzoxazole ethiodide, 0.55 g. of 3-ethyl-1-phenyl-2-thiohydantoin, 10 cc. of absolute ethyl alcohol and 0.27 g. of triethylamine were mixed in a 200 cc. flask and refluxed for 5 minutes. The reaction mixture was chilled to 0° C. and the dye which separated was filtered off, washed with ethyl alcohol and then with water. It was twice recrystallized from a mixture of equal volumes of pyridine and methyl alcohol. It was obtained as fine orange needles, melting at 258° to 259° C. with decomposition.

In a manner similar to that illustrated in the foregoing Examples 12 and 13 other rhodanines, other 2-thiohydantoins, other 2-thio-2,4(3,5)-oxazolediones, other barbituric acids and other 2-thiobarbituric acids can be condensed with the dye intermediates of our invention to give acyloxy merocarbocyanine dyes.

To prepare the hydroxy merocarbocyanine dyes represented by Formula X above, the acyloxy merocarbocyanine dyes are advantageously hydrolyzed with an alkali metal hydroxide, e. g. sodium or potassium hydroxide. The hydrolysis is advantageously effected in an alcohol, e. g. methyl, ethyl, or isopropyl alcohol. The following examples will further illustrate the manner of obtaining the hydroxy merocarbocyanine dyes.

Example 14.—3-ethyl-5[(3-ethyl-5-hydroxy-2(3)-benzoxazolylidene)ethylidene]rhodanine

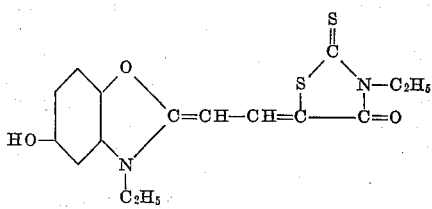

1.2 g. of 5-[(5-acetoxy-3-ethyl-2(3)-benzoxazolylidene)-ethylidene]-3-ethylrhodanine and 125 cc. of methyl alcohol were heated to boiling and 1 cc. of 40% (by weight) aqueous sodium hydroxide was added. Boiling was continued for 30 seconds. The hot reaction mixture was filtered and the filtrate cooled to about 20° C. The cooled filtrate was made acid with glacial acetic acid and the mixture was chilled to 0° C. The dye was filtered off, washed with methyl alcohol and twice purified by dissolving in ethyl alcoholic sodium hydroxide and precipitating from such solution with glacial acetic acid. The dye was obtained as fine maroon needles, melting at 294° to 295° C. with decomposition.

Example 15.—3-ethyl-5-[(3-ethyl-5-hydroxy-2(3)-benzoxazolylidene)ethylidene]-1-phenyl-2-thiohydantoin

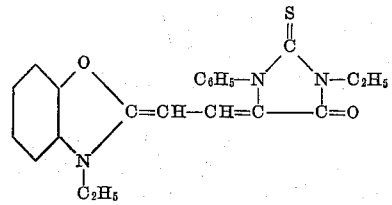

0.35 g. of 5-[(5-acetoxy-3-ethyl-2(3)-benzoxazolylidene)-ethylidene]-3-ethyl-1-phenyl-2-thiohydantoin and 100 cc. of methyl alcohol were heated to boiling and 0.3 cc. of 40% (by weight) aqueous sodium hydroxide were added. Boiling was continued for 30 seconds. The resulting solution was filtered hot and the filtrate cooled to about 20° C. The filtrate was made acid with glacial acetic acid and chilled to 0° C. The dye which separated was filtered off and washed with methyl alcohol. The dye was purified by twice dissolving in ethyl alcoholic sodium hydroxide and precipitating therefrom with glacial acetic acid. It was obtained as orange crystals melting at 288° to 290° C. with decomposition.

Example 16.—1-carboxymethyl-5-[(3-ethyl-5-hydroxy-2(3)-benzoxazolylidene)ethylidene]-3-phenyl-2-thiohydantoin

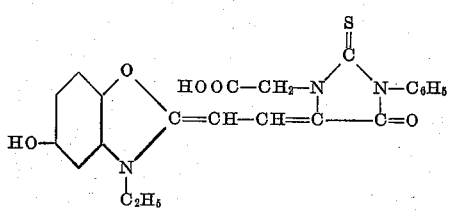

2.5 g. of 2-β-acetanilidovinyl-5-acetoxybenzoxazole ethiodide, 1.25 g. of 1-carboxymethyl-3-phenyl-2-thiohydantoin, 20 cc. of methyl alcohol and 1 g. of triethylamine were mixed in a 200 cc. flask and refluxed for 30 minutes. The reaction mixture was cooled to about 20° C. and made acid with ethyl alcoholic hydrogen chloride. The acid mixture was chilled to 0° C. and poured into cold water. The precipitated acetoxy dye was filtered off and washed with water.

The acetoxy dye (2.1 g.) was dissolved in methyl alcohol and 3 cc. of a 40% (by weight) solution of sodium hydroxide was added. The mixture was heated on a steam bath for 30 seconds. The reaction mixture was filtered hot and the filtrate cooled to about 20° C. The filtrate was made acid with ethyl alcoholic hydrogen chloride, whereupon the hydroxy dye precipitated. The hydroxy dye was filtered off and purified by dissolving in ethyl alcoholic triethylamine and precipitating the dye by acidifying with aqueous acetic acid. The dye was obtained as fine brown needles, melting at 232° to 234° C. with decomposition.

Ketomethylene compounds of Formula IX containing acid groups have been described in Brooker and Keyes 2,493,748, dated January 10, 1950 and Brooker and White U. S. Patent 2,493,747, dated January 10, 1950. Still other heterocyclic ketomethylene compounds containing acid groups are described in the following examples.

Example 17.—1-carboxymethyl - 3 - phenyl-2-thiobarbituric acid

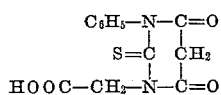

23.8 g. (1 mol.) of N-carbethoxymethyl-N'-phenylthiourea, 10.4 g. (1 mol.) of malonic acid and 50 cc. of acetic acid were heated together on a steam bath. 50 cc. of acetic anhydride were then added dropwise over a period of about 1½ hours. The excess of acetic anhydride was decomposed by adding 25 cc. of warm water and heating the mixture on the steam bath for 10 minutes. The resulting acetic acid solution of the 1 - carbethoxymethyl - 3 - phenyl - 2 - thiobarbituric acid was concentrated to small volume. Hydrolysis of the ester was brought about by dissolving in dilute aqueous sodium hydroxide (10% by weight) and refluxing for about 5 minutes. The alkaline solution was filtered hot and the filtrate then chilled. The filtrate was acidified with hydrochloric acid, whereupon the 1-carboxymethyl - 3 - phenyl - 2 - thiobarbituric acid separated as a sticky semisolid. It was collected on a filter and washed with methyl alcohol. Upon drying, it was obtained as a light brownish powder.

The N - carbethoxymethyl - N' - phenylthiourea employed above was prepared as follows:

13.5 g. (1 mol.) of phenylisothiocyanate and 13.9 g. (1 mol.) of glycine ethyl ester hydrochloride were dissolved in 25 cc. of boiling absolute ethyl alcohol. To this solution were added 10.1 g. (1 mol.) of triethylamine and the mixture was refluxed for 15 minutes. After cooling, the solution was poured into 150 cc. of cold water. The product separated as an oil. It was allowed to solidify, filtered off and washed with water. It was recrystallized from methyl alcohol and obtained as colorless crystals, melting at 83° to 86° C.

The 1 - carboxymethyl - 3 - phenyl - 2 - thiobarbituric acid can be condensed with the acyloxy intermediates of our invention to give acyloxy merocarbocyanine dyes. It can also be condensed with 2-β-acetanilidovinylbenzoxazole ethiodide, in pyridine, to give (after acidification with hydrochloric acid) 1-carboxymethyl - 5 - [(3-ethyl-2(3) - benzoxazolylidene)ethylidene] - 3 - phenyl-2-thiobarbituric acid, a reddish crystalline powder, melting at 204° to 206° C. with decomposition.

Example 18.—1-carboxymethyl-3-phenylbarbituric acid

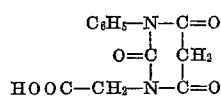

11.1 g. (1 mol.) of N-carbethoxymethyl-N'-phenylurea (Bailey, Jour. Am. Chem. Soc. 28, 394 (1902) and 5.2 g. (1 mol.) of malonic acid were suspended in 100 cc. of dry chloroform. 15.4 g. of phosphorus oxychloride were added and the mixture was refluxed for six hours. Solvents were then distilled off and the residue was extracted with dilute aqueous sodium bicarbonate and the aqueous layer was filtered. On acidification of the filtrate with hydrochloric acid, the 1-carboxymethyl-3-phenylbarbituric acid separated as a sticky mass. This mass was dissolved in 10% (by weight) aqueous sodium hydroxide and the solution refluxed for 30 minutes to insure hydrolysis of the ester. Upon acidifying the cool reaction mixture with dilute hydrochloric acid, the 1-carboxymethyl-3-phenylbarbituric acid separated in a crystalline state.

The 1-carboxymethyl-3-phenylbarbituric acid can be condensed with the acyloxy intermediates of our invention to give merocarbocyanine dyes. It can also be condensed with 2-(4-methoxy-1,3-butadienyl)benzoxazole ethiodide, in ethyl alcohol containing triethylamine, to give 1-carboxymethyl - 5 - [(3 - ethyl - 2(3) - benzoxazolylidene)butenylidene] -3-phenylbarbituric acid—minute purple crystals melting at 240° to 242° C. with decomposition.

The new acyloxy polymethine dyes of our invention represented by Formulas III-V above can be employed to sensitize photographic silver halide emulsions. To prepare photographic emulsions sensitized with our new dyes, it is only necessary to disperse the dyes in the emulsions. It is convenient to add the dyes to the emulsions from solutions in appropriate solvents. Methyl alcohol has proven satisfactory for this purpose. Ethyl alcohol can also be used. Sensitization by means of these dyes is, of course, directed primarily to the ordinarily employed gelatino-silver-halide developing-out emulsions. The dyes (one or more) are ordinarily incorporated in the washed, finished emulsions and should, of course, be uniformly distributed throughout the emulsion. The concentration of the dyes in the emulsions can vary widely, i. e. from about 5 to about 100 mg. per liter of flowable emulsion. The concentration of the dye will vary according to the type of light-sensitive material in the emulsion and according to the effect desired. The suitable and most economical concentration for any given emulsion will be apparent to those skilled in the art of emulsion making. To prepare a gelatino-silver-halide emulsion sensitized with one or more of these dyes, the following procedure is satisfactory. A quantity of the dye is dissolved in methyl alcohol or other suitable solvent, and a volume of this solution (which may be diluted with water) containing from 5 to 100 mg. of dye is slowly added to 1000 cc. of gelatino-silver-halide emulsion, with stirring. Stirring is continued until the dye is uniformly distributed throughout the emulsion. With most of these sensitizing dyes, 10 to 20 mg. of dye per liter of emulsion suffices to produce the maximum sensitizing effect with the ordinary gelatino-silver-bromide (including bromiodide) emulsions. With gelatino-silver-chloride emulsions somewhat larger concentrations may be required to produce the optimum sensitizing effect. The above statements are only illustrative and are not to be understood as limiting our invention, as it will be apparent that these dyes can be incorporated by bathing a plate or film upon which an emulsion has been coated, in a solution of the dye in an appropriate solvent. Bathing methods, however, are not to be preferred ordinarily. Emulsions sensitized with our new dyes can be coated on the usual supports of paper, cellulose acetate film, cellulose nitrate film, glass, polyvinyl acetal film, etc., in the usual manner.

What we claim as our invention and desire to secure by Letters Patent of the United States is:

1. The acyloxy polymethine dyes selected from those represented by the following general formula:

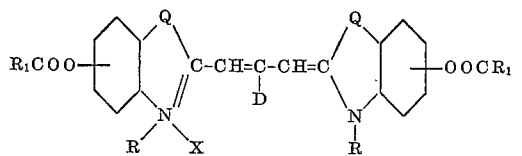

wherein R and $R_1$ each represents an alkyl group containing from 1 to 4 carbon atoms, D represents a member selected from the group consisting of a methyl group and an ethyl group, Q represents a member selected from the group consisting of an oxygen atom and a sulfur atom, and X represents an anion.

2. A 5,5'-diacyloxy-3,3',9-trialkylthiacarbocyanine salt wherein each of the acyloxy groups contains from 2 to 5 carbon atoms and each of the alkyl groups contains from 1 to 2 carbon atoms.

3. A 6,6'-diacyloxy-3,3',9-trialkylthiacarbocyanine salt wherein each of the acyloxy groups contains from 2 to 5 carbon atoms and each of the alkyl groups contains from 1 to 2 carbon atoms.

4. A 5,5'-diacyloxy-3,3',9-trialkyloxacarbocyanine salt wherein each of the acyloxy groups contains from 2 to 5 carbon atoms and each of the alkyl groups contains from 1 to 2 carbon atoms.

5. A 5,5'-diacetoxy-3,3'-dialkyl-9-methylthiacarbocyanine salt wherein each of the alkyl groups contains from 1 to 4 carbon atoms.

6. A 6,6'-diacetoxy-3,3'-dialkyl-9-methylthiacarbocyanine salt wherein each of the alkyl groups contains from 1 to 4 carbon atoms.

7. A 5,5'-diacetoxy-3,3'-dialkyl-9-methyloxacarbocyanine salt wherein each of the alkyl groups contains from 1 to 4 carbon atoms.

8. A 3,3'-dialkyl-9-ethyl-5,5'dipropionoxythiacarbocyanine salt wherein each of the alkyl groups contains from 1 to 4 carbon atoms.

9. A 3,3'-dialkyl-9-ethyl-6,6'-dipropionoxythiacarbocyanine salt wherein each of the alkyl groups contains from 1 to 4 carbon atoms.

10. The dye represented by the following formula:

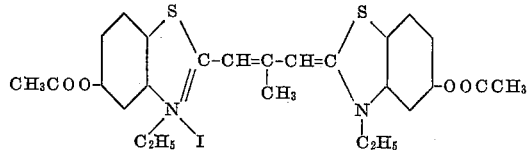

11. The dye represented by the following formula:

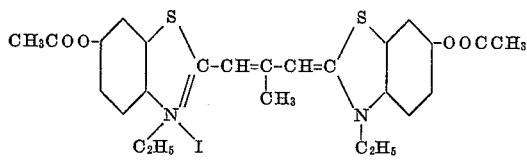

12. The dye represented by the following formula:

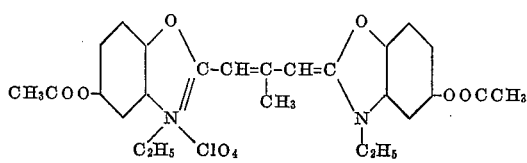

13. The dye represented by the following formula:

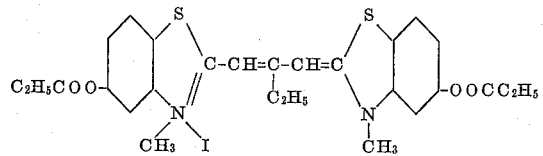

14. The dye represented by the following formula:

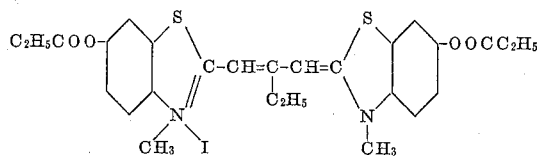

15. A process for preparing acyloxy polymethine dyes comprising condensing a hydroxy cyclammonium alkyl salt selected from those represented by the following general formula:

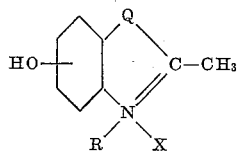

wherein R represents an alkyl group, X represents an anion, and Q represents a member selected from the group consisting of an oxygen atom and a sulfur atom, with an ortho ester selected from those represented by the following general formula:

$$D(OR')_3$$

wherein D represents an alkyl group and R' represents an alkyl group, and an organic carboxylic anhydride selected from those represented by the following general formula:

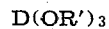

wherein $R_1$ represents an alkyl group.

16. A process for preparing acyloxy polymethine dyes comprising condensing a hydroxy benzothiazolium alkyl salt with an alkyl orthoacetate and acetic anhydride.

17. A process for preparing acyloxy polymethine dyes comprising condensing a hydroxy benzoxazolium alkyl salt with an alkyl orthoacetate and acetic anhydride.

18. A process for preparing acyloxy polymethine dyes comprising condensing a hydroxy benzothiazolium alkyl salt with an alkyl orthopropionate and propionic anhydride.

References Cited in the file of this patent

UNITED STATES PATENTS

| Number | Name | Date |
|---|---|---|
| 2,398,999 | Brooker et al. | Apr. 23, 1946 |
| 2,575,373 | Van Lare | Nov. 20, 1951 |

FOREIGN PATENTS

| Number | Country | Date |
|---|---|---|
| 135,354 | Austria | June 15, 1933 |

OTHER REFERENCES

Kupruanov, J. Gen. Chem. (USSR) vol. 15, No. 3, pp. 200–206, 1945.